US010391929B1

United States Patent
McNabb et al.

(10) Patent No.: US 10,391,929 B1
(45) Date of Patent: Aug. 27, 2019

(54) LIGHTED PATH SYSTEM FOR VEHICLE

(71) Applicant: FICOSA NORTH AMERICA CORPORATION, Madison Heights, MI (US)

(72) Inventors: Patrick Aaron McNabb, Dearborn, MI (US); Sergio Hellin Navarro, Bloomfield Hills, MI (US); Nicholas Paul Schmidt, Shelby Township, MI (US)

(73) Assignee: Ficosa North America Corporation, Madison Heights, MI (US)

( * ) Notice: Subject to any disclaimer, the term of this patent is extended or adjusted under 35 U.S.C. 154(b) by 0 days.

(21) Appl. No.: 16/105,652

(22) Filed: Aug. 20, 2018

(51) Int. Cl.
*B60Q 1/24* (2006.01)
*F21S 41/16* (2018.01)
*F21S 41/141* (2018.01)
*F21S 41/657* (2018.01)

(52) U.S. Cl.
CPC ............ *B60Q 1/245* (2013.01); *F21S 41/141* (2018.01); *F21S 41/16* (2018.01); *F21S 41/657* (2018.01)

(58) Field of Classification Search
CPC .......... B60Q 1/245; B60Q 1/085; B60Q 1/10; B60Q 1/12; B60Q 2300/10; B60Q 1/1423; F21S 41/657; F21S 41/16; F21S 41/141; F21V 23/0442
See application file for complete search history.

(56) References Cited

U.S. PATENT DOCUMENTS

| | | | |
|---|---|---|---|
| 4,890,907 A | 1/1990 | Vu et al. | |
| 5,497,306 A | 3/1996 | Pastrick | |
| 5,669,704 A | 9/1997 | Pastrick | |
| 5,863,116 A | 1/1999 | Pastrick et al. | |
| 6,616,313 B2 | 9/2003 | Fürst et al. | |
| 7,164,853 B2 | 1/2007 | Tomita | |
| 7,682,056 B2 | 3/2010 | Furtwängler | |
| 8,842,176 B2 | 9/2014 | Schofield et al. | |
| 9,925,921 B1* | 3/2018 | Deyaf | B60Q 1/245 |
| 2017/0120801 A1* | 5/2017 | Asaoka | B60Q 1/143 |
| 2018/0082588 A1* | 3/2018 | Hoffman, Jr. | G08G 1/166 |
| 2019/0054897 A1* | 2/2019 | Naitou | B60R 25/24 |

OTHER PUBLICATIONS

Kirchner, Chad, "Every Truck Needs LED Side-Mirror Spotlights", Mar. 17, 2015, Ford-Truck.com, 8 pg. https://www.ford-trucks.com/articles/every-truck-needs-led-side-mirror-spotlights/.
Audi e-tron Sportback concept (Auto Shanghai 2017), YouTube, 1 pg. https://www.youtube.com/watch?v=GK8yli_2zMo.
Liszewski, Andrew, "BMW's New 7 Series Illuminates a Path to Your Car's Door at Night", Oct. 9, 2015, 2 pg. GIZMODO.com, http://gizmodo.com/bmws-new-7-series-illuminates-a-path-to-your-cars-door-1735646178.
Author Unknown, "OSRAM Illuminates the Road Ahead for Rinspeed's Concept Car Oasis", OSRAM.com, 4 pg. https://www.osram.com/corporate/home/events/ces-2017/rinspeed-oasis/index.jsp.

\* cited by examiner

*Primary Examiner* — Joseph L Williams
*Assistant Examiner* — Jose M Diaz
(74) *Attorney, Agent, or Firm* — Brooks Kushman, P.C.

(57) ABSTRACT

A vehicle illumination system for illuminating a path to a vehicle may include a light mechanism arranged on the vehicle, at least one antenna configured to detect a unique device of an approaching user; and at least one controller. The controller may be configured to determine a user location based on the detected unique device, predict the path based at least in part on the user location, and instruct the light mechanism to illuminate an area along the path.

20 Claims, 5 Drawing Sheets

LIGHTED PATH SYSTEM FOR VEHICLE

TECHNICAL FIELD

Disclosed herein are lighted path systems for vehicles.

BACKGROUND

Motor vehicles include various exterior and interior lamps for increasing visibility during non-daylight hours. These lamps may be automatic, and may include head-lamps, interior running lights, etc.

SUMMARY

A vehicle illumination system for illuminating a path to a vehicle may include a light mechanism arranged on the vehicle, at least one antenna configured to detect a unique device of an approaching user, and at least one controller. The controller may be configured to determine a user location based on the detected unique device, predict the path based at least in part on the user location, and instruct the light mechanism to illuminate an area along the path.

A method for providing an illumination area between a vehicle and a user, may include detecting the user within an area of the vehicle, determining a user location based on communication with a unique device associated with the user, predicting a path to the vehicle based at least in part on the user location, and instructing a light mechanism to illuminate the area along the path.

A vehicle illumination system may include a light mechanism arranged on a vehicle, at least one antenna configured to detect a unique device of an approaching user, and at least one controller. The controller may be configured to determine a first user location based on the detected unique device, predict a path between the user and the vehicle based at least in part on the first user location, instruct the light mechanism to illuminate a first area along the path, determine a second user location based on the detected unique device, and instruct the light mechanism to illuminate a second area along the path.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is a lighted vehicle system configured to illuminate an area between a user and a vehicle as the user approaches the vehicle in order to provide the user with a lighted path to the vehicle. The illuminated area may iteratively move as the user moves to provide light at the user's location. The light may cease upon recognition of a trigger event.

Figure 1:
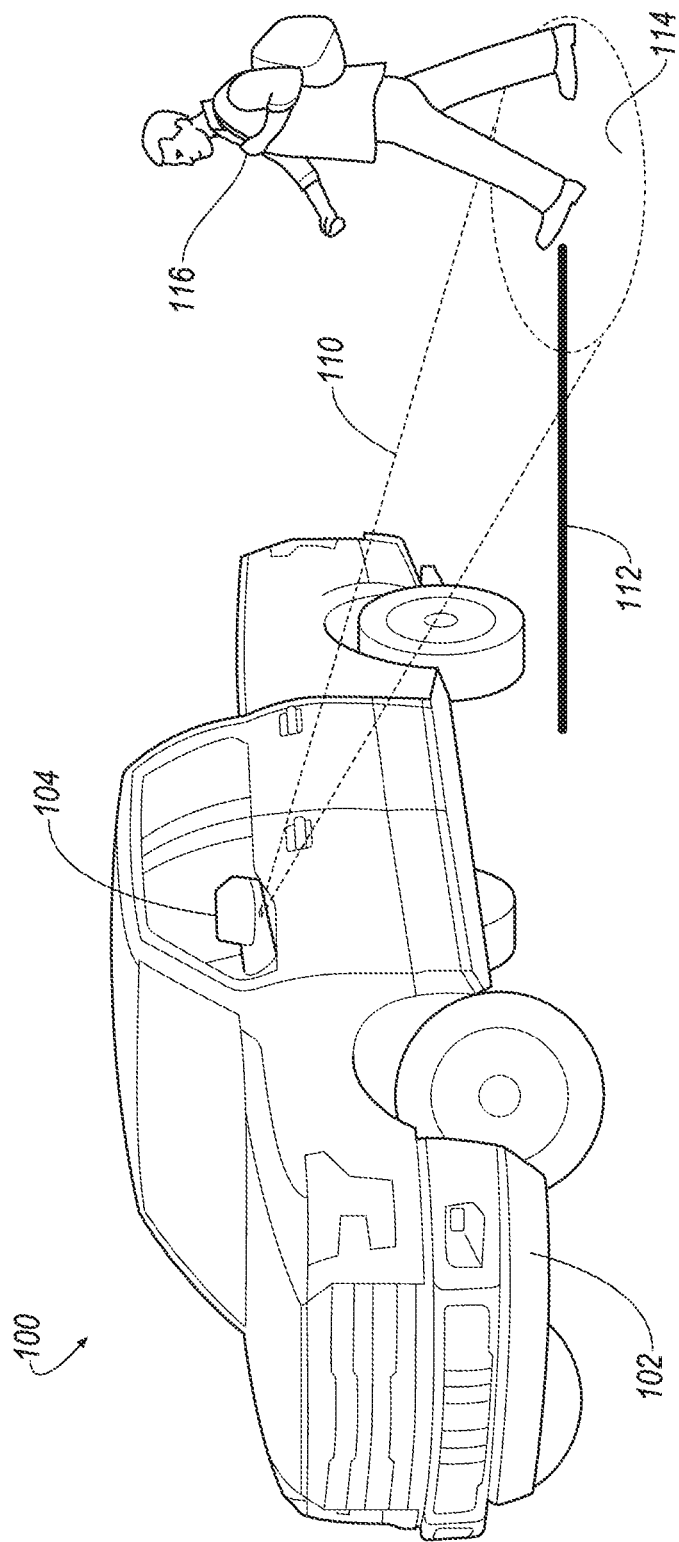
FIG. 1 illustrates an example lighted system for a vehicle.

FIG. 1 illustrates an example lighted vehicle system 100 for a vehicle 102. The vehicles 102 is illustrated as a truck, but may be any motor passenger vehicle including but not limited to a truck, sport utility vehicle, cross-over, hatchback, station wagon, motorcycle, all-terrain vehicle (ATV), recreational vehicle (RV), boat, plane or other mobile machine for transporting people or goods, etc.

The vehicle 102 may include at least one winglet 104, such as a vehicle mirror (as shown in FIG. 1). The winglet 104 may also be a roof rack, door handle, or other protrusion of the vehicle or vehicle component. The winglet 104 may house a light mechanism 110 configured to emit light illuminating a portion of a path 112 approaching the vehicle 102. The illuminated portion, referred to herein as the illuminated area 114, may provide a lighted path to an approaching user 116 of the vehicle 102.

While the light mechanism 110 is described throughout as being arranged on the winglet 104, the light mechanism 110 may also be mounted on other exterior areas of the vehicle 102. For example, the light mechanism 110 may be arranged on a door handle. The light mechanism 110 may be arranged on running boards, mud flaps, roof racks, bumpers, etc. The vehicle 102 may include more than one light mechanism 110. In one example, a light mechanism 110 may be arranged on each side view mirror. A light mechanism 110 may also be arranged on each door handle.

The vehicle 102 may detect the approaching user 116 by receiving a signal from a unique device (as shown as unique device 118 in FIG. 2), such as a key fob or mobile device. Upon detection of the unique device 118, the vehicle 102 may authenticate the user 116 as a driver of the vehicle 102. A BLUETOOTH low energy module may, via antennas, triangulate the user's location with respect to the vehicle 102. Additionally or alternatively, global positioning systems may be used to identify the user's location. The vehicle 102 may then instruct the light mechanism 110 to illuminate the lighted path 112 so as to provide the illuminated area 114 to the user 116 as the user 116 approaches the vehicle 102.

Figure 2:
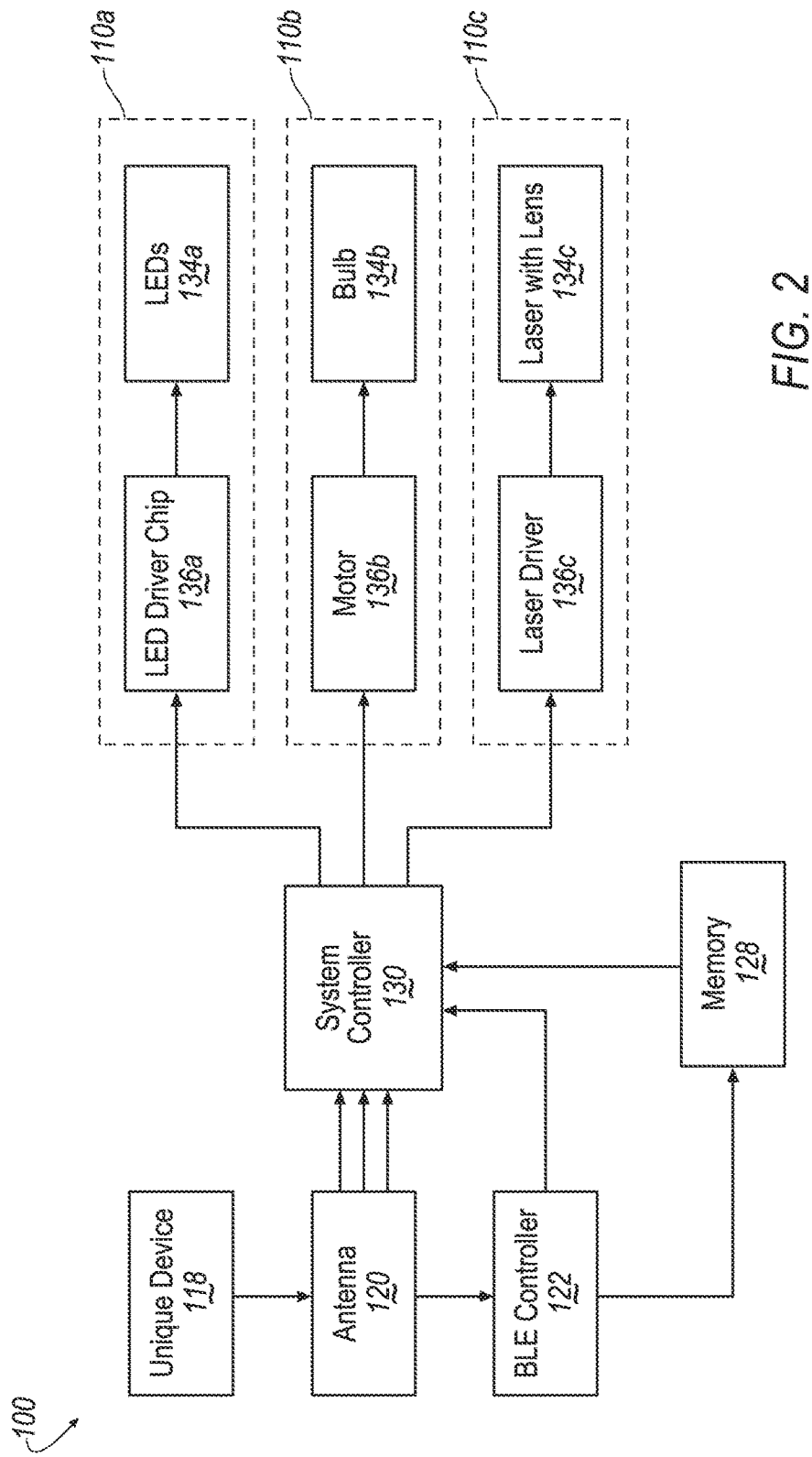
FIG. 2 illustrates a block diagram of the system of FIG. 1.

FIG. 2 illustrates a block diagram of the system 100 of FIG. 1. The system 100 may include the unique device 118. As described above with respect to FIG. 1, the unique device 118 may be a key fob or mobile device unique to the user 116. The unique device 118 may be used to gain entry into the vehicle 102 via a vehicle passive entry passive start (PEPS) system.

The system 100 may include at least one antenna 120 configured to emit and transmit low energy signals. In the example shown in FIG. 2, the antenna 120 may be a BLUETOOTH Low Energy (BLE) antenna configured to transmit a low frequency challenge signal and receive a response from the unique device 118.

The antenna 120 may communicate with a BLE controller 122. The BLE controller 122 may be a controller configured to receive antenna input signals. BLE controller 122 may determine the location of the user 116 based on the antenna input signals. The BLE controller 122 may triangulate the response signals received from the unique device 118 to determine the user location. Because the antenna 120 may continually listen for frequency responses, the BLE controller 122 may continually receive antenna input signals. The user location may then in turn be continually updated.

Although not shown, the system 100 may include a GPS system configured to determine the user location based on GPS data acquired from the unique device 118. For example, the unique device 118 may be a mobile device, such as a cellular phone, having a GPS module configured to determine the location of the phone. This location may then be transmitted to the vehicle 102 and used thereby to identify the user location.

The BLE controller 122 may then transmit the user location to a system controller 130. The system controller 130 may be a microcontroller or integrated circuit configured to analyze the received user location from the BLE controller 122. The system controller 130 may, for example, receive the current user location. Based on the current user location, the system controller 130 may predict the path 112 that the user 116 may follow as he or she approaches the vehicle 102.

This path 112 may be predicted based on one or more factors. These factors may include the current user location as received from the BLE controller 122, as well as previous user locations. The previous user locations may be the user location at a time immediately or near immediately preceding the current user location and may be used to determine a moving speed of the user 116. The moving speed of the user 116 may be used to predict the speed at which the user 116 may move along the path 112.

The system controller 130 may also determine a predicted vehicle door based on the user location. For example, depending on which side of the vehicle 102 the user 116 is approaching from, the system controller 130 may predict whether the user 116 is approaching the driver-side door, passenger door, rear door, etc.

The system controller 130 may communicate with the light mechanism 110 and provide instructions to the light mechanism 110 to illuminate the illumination area 114 based on the predicted path 112. The lighted area 114 may be an area that includes the user location, as well as the area immediately preceding the user location (e.g., between the user 116 and the vehicle 102). This would allow the user 116 to have a lighted area in front of the user 116 as the user 116 approaches the vehicle 102. The lighted area 114 may move along the path 112 as the user 116 moves.

The light mechanism 110 may include a light source 134 (labeled as 134a and 134b in FIG. 2) configured to emit light, such as a lamp, light emitting diodes (LEDs) 134a, bulb 134b, incandescence lights, lasers 134c, optics, etc. The light source 134 may be capable of projecting light onto a surface, such as the ground, at various angles. The light source 134 may be configured to selectively illuminate the illumination area 114 of the illuminated path 112. The illumination area 114 may move as the user 116 moves. That is, as the user 116 approaches the vehicle 102, the illumination area 114 may move along the path 112 towards the vehicle 102 to light the area directly in front of the user 116. This creates a spot-light type feature for the user 116 as he or she approaches the vehicle 102.

In order to create the spot-light type function, the light mechanism 110 may alter the light source's directional projection in order to accommodate the dynamic and changing illumination area 114. The light mechanism 110 may include the light source 134 and a driver 136 (labeled as 136a and 136b in FIG. 2) configured to control the light source 134, or projection thereof. FIG. 2 illustrates three examples of light sources 134 and drivers 136.

In one example, a first light mechanism 110a may include a first light source 134a, as shown in FIG. 2, which is a plurality of LEDs (also referred to as LEDs 134a). The first light mechanism 110a may include an LED driver chip 136a configured to control and drive the LEDs 134a. In this example, the LEDs 134a may include a plurality of LED arrays. Each array may illuminate a certain area. By turning on one array, and turning off others, a certain area may be illuminated. The LED driver chip 136a may selectively illuminate the LED arrays depending on the user's location, as instructed by the system controller 130.

A second light mechanism 110b may include a motor 136b, or driver. The motor 136b may be configured to move or rotate a light source 134b. In this example, the light source 134b may be a light configured to emit light, such as a light bulb. The second light source 134b may be configured to create a spot-light on the illumination area 114. The second light source 134b may move in order to alter the illumination area 114 provided by the light source 134b. The motor 136b may rotate the light source 134b about X, Y and/or Z axis. By rotating the light source 134b, the directional projection of the light beam is altered, as well as the illuminated area 114. As the user location changes, then the desired illuminated path 112 changes. The system controller 130 may instruct the motor 136b to adjust the light source 134b, so that the projection achieves the desired illuminated area 114.

A third light mechanism 110c may include a laser driver 136c configured to control a laser 134c. The laser 134c may include a lens configured to adjust in response to commands from the driver 136c. The lens may include a plurality of lenses or matrix of lasers. Each laser may correspond to an area of the illumination area 114. Depending on the desired illumination path 112, various lasers may be 'turned on' to illuminate the path 112. This is described in more detail with respect to FIGS. 5a and 5b.

The system controller 130 may instruct the light mechanism 110 to emit light until a trigger event is recognized. A trigger event may include an indication that the user 116 has reached the vehicle 102. For example, the trigger event may include actuation of a door handle, a door opening, vehicle start, etc.

The system 100 may include a memory 128 in communication with the BLE controller 122 and the system controller 130. The memory 128 may be a computer-readable memory configured to store and carry out instructions from the BLE controller 122 and system controller 130.

Figure 3:
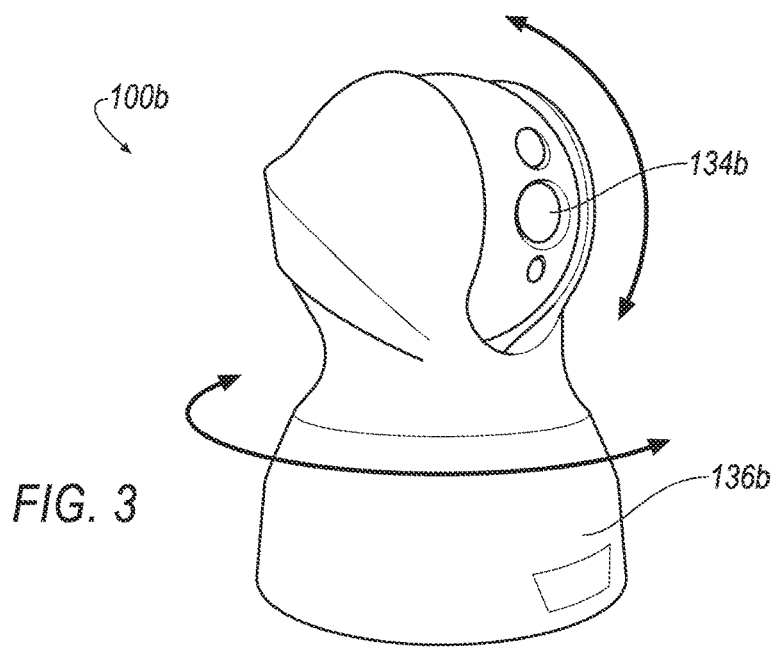
FIG. 3 illustrates an example second light mechanism.

FIG. 3 illustrates an example second light mechanism 110b. In this example, the motor 136b may be integrated with the light source 134b. The motor 136b may drive the light source 134b, allowing the light source 134b to rotate 100 degrees in the Y-axis and 350 degrees in the X-axis. More or less rotative range may be appreciated, as well as a third axis of movement.

Figure 4:
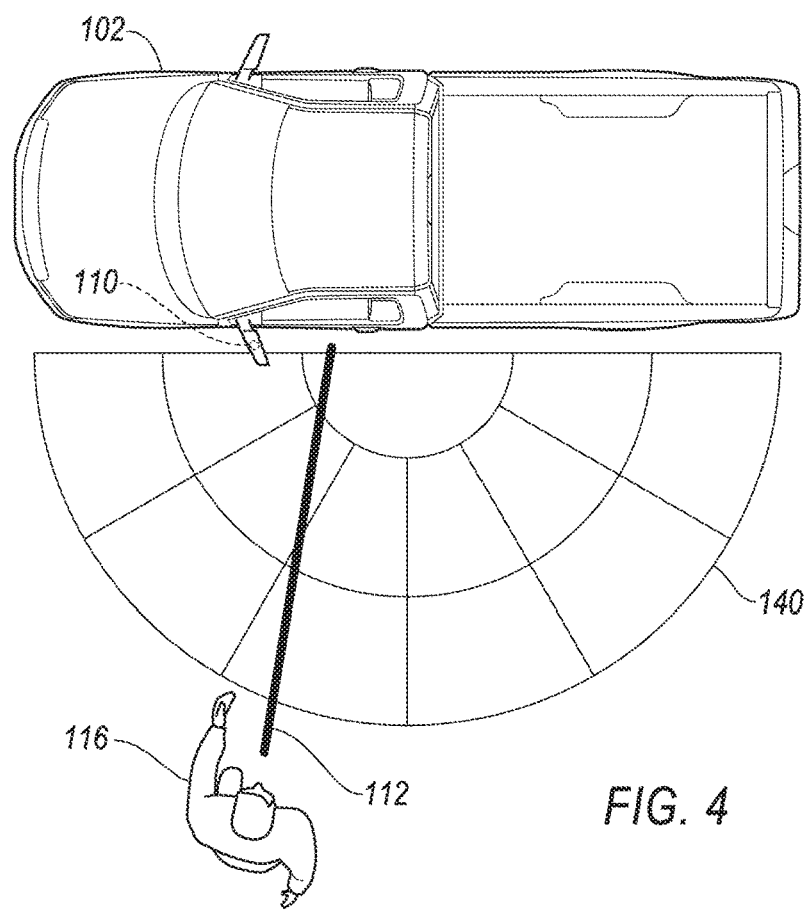
FIG. 4 illustrates an example area coverage of the light mechanism.

FIG. 4 illustrates an example area coverage 140 of the light mechanism 110. The area coverage 140 may extend a certain radius from the light mechanism 110. The path 112 may extend through the area coverage 140, or at least in part extend through the area coverage 140. As a practical matter, the size of an illumination area 114 may depend on the type of light source 134, as well as the distance of the illumination area 114 from the light source 134. The further the light source 134 is being projected, the larger the beam spread, but lower the intensity. Thus, as the user 116 approaches the vehicle 102, and as the user 116 closes the distance between the vehicle 102 and the light mechanism 110, the smaller and more intense the illumination of the light source 134 may be. This may be especially true for the second light mechanism 110b implementing a motor and bulb, as described above.

Figure 5A:
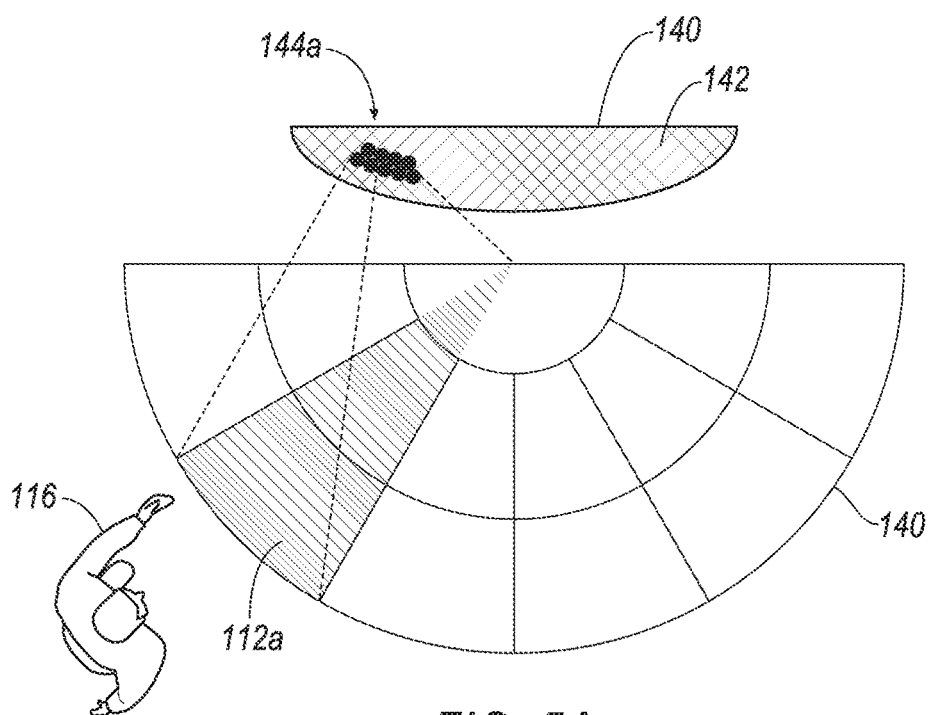
FIGS. 5a and 5b illustrate example third light mechanism.
Figure 5B:
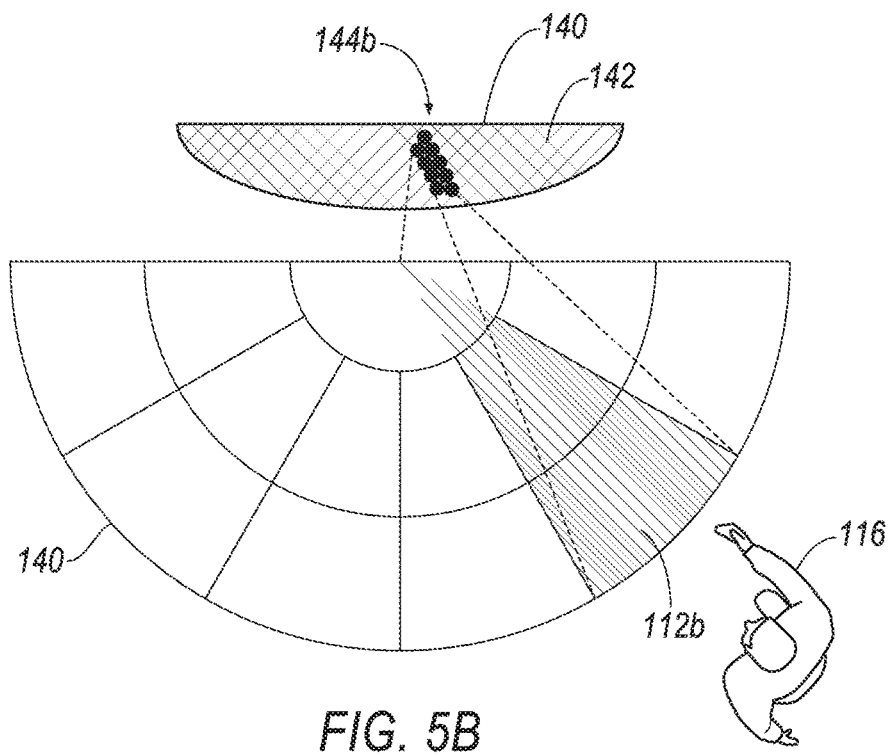

FIGS. 5a and 5b illustrate example lasers 134c of the third light mechanism 110c. The laser 134c may include a matrix 142 of lasers. The controller 130 may instruct certain lasers to activate, via the laser driver 136c, to illuminate the path 112. Various lasers may correspond to various portions of the coverage area 140. That is, each laser 134c may illuminate a corresponding portion of the coverage area 140. The lasers may include a diode laser such as a LARP gen2™ laser.

FIG. 5a illustrates a first set of activated lasers 144a configured to illuminate a first path 112a. FIG. 5b illustrates a second set of activated lasers 144b configured to illuminate a second path 112b. The laser driver 136c may instruct various lasers 144 to activate in order to achieve the desired path 112. While the examples in FIGS. 5a and 5b are discussed relative to the laser 134c of the third light mechanism 110c, a similar configuration may be recognized with respect to an LED matrix 134a of the first light mechanism 110a. Various LEDs 134a may be illuminated to achieve a corresponding path 112.

Figure 6:
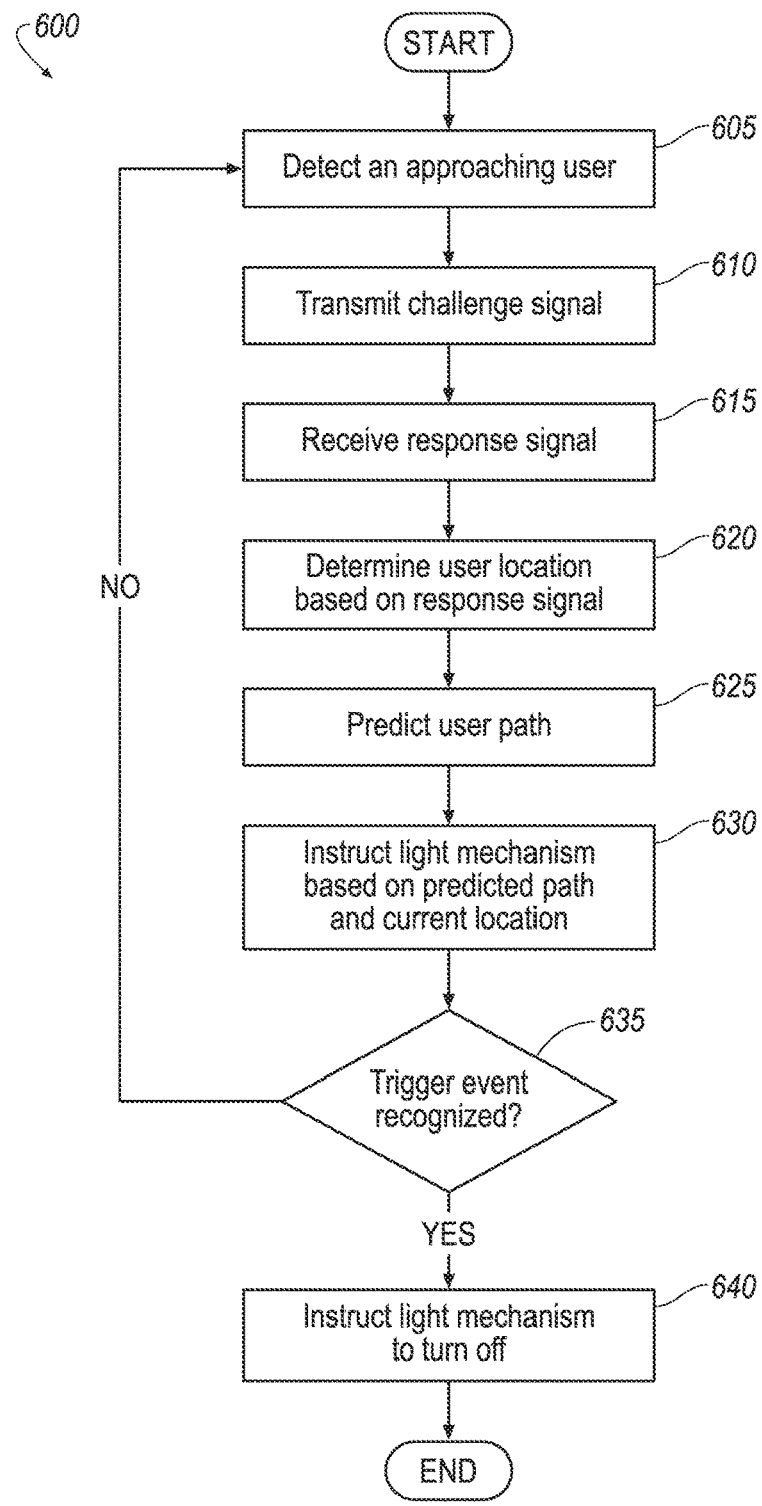
FIG. 6 illustrates an example process for the lighted vehicle system.

FIG. 6 illustrates an example process 600 for the lighted vehicle system 100. The process 600 may begin at block 605 where the vehicle 102 may detect the approaching user 116. The vehicle 102 may detect the approaching user 116 upon receiving a signal from the unique device 118 associated with the user 116, such as a key fob or mobile device.

At block 610, in response to detecting the approaching user 116, the BLE controller 122 may instruct one of the many associated antennas 120 to transmit challenge signals.

At block 615, the BLE controller 122 may receive an indication of at least one response signal. The response signals may be received via the antennas 120 from the unique device 118.

At block 620, the BLE controller 122 may determine a user location based on the response signals. As explained above, this location may be determined at least in part, by triangulating the various response signals.

At block 625, the system controller 130 may predict the path 112 based on factors, such as the current user location, as determined in block 620. Additional factors may also be included, such as the moving speed of the user 116 and a predicted vehicle door.

At block 630, the system controller 130 may provide instructions to the light mechanism 110 to produce an illuminated area 114 along the path 112 based on the user location. As explained above, the illuminated area 114 may be a spot-light located at and/or slightly in front of the user location so as to illuminate the walking path 112 of the user 116 as the user 116 approaches the vehicle 102.

At block 635, the system controller 130 may determine whether a trigger event has been recognized, such as a door handle actuation or door opening. If a trigger event has been recognized, then the process 600 proceeds to block 640. If not, the process 600 proceeds to block 605 where the system 100 continues to determine the user location and iteratively adjust the location of the illumination area 114.

At block 640, the system controller 130 may instruct the light mechanism 110 to cease to emit light.

The process 600 then ends.

While the process 600 is described above as being implemented by the BLE controller 122 and the system controller 130, other processors and controllers may be used.

Computing devices described herein generally include computer-executable instructions, where the instructions may be executable by one or more computing or hardware devices, such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions (e.g., from a memory, a computer-readable medium, etc.) and executes these instructions, thereby performing one or more processes, including one or more of the processes described herein. Such instructions and other data may be stored and transmitted using a variety of computer-readable media.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle illumination system for illuminating a path to a vehicle, comprising:
    a light mechanism arranged on the vehicle;
    at least one antenna configured to detect a unique device of an approaching user; and
    at least one controller configured to:
        determine a user location based on the detected unique device,
        predict the path based at least in part on the user location, and
        instruct the light mechanism to illuminate an area along the path.

2. The system of claim 1, wherein the controller is further configured to:
    receive a subsequent user location and instruct the light mechanism to illuminate a subsequent area along the path based on the subsequent user location.

3. The system of claim 2, wherein the controller is further configured to:
    determine a predicted user speed based on the subsequent user location and instruct the light mechanism to iteratively illuminate the area along the path consistent with the user speed.

4. The system of claim 1, wherein the light mechanism includes a plurality of light mechanisms, and wherein each of the light mechanisms is configured to illuminate a portion of the predicted path.

5. The system of claim 4, wherein the light mechanism includes at least one of a laser, laser diode, and light emitting diode (LED).

6. The system of claim 4, wherein the controller is further configured to instruct a subset of the light mechanisms to activate, wherein the subset of light mechanisms correspond to a portion of the predicted path.

7. The system of claim 1, wherein the light mechanism includes a light source operably connected to a driver, the light source being moveable at at least one axis via the driver.

8. The system of claim 7, wherein the controller is further configured to instruct the driver to move the light source to illuminate the area along the path.

9. A method for providing an illumination area between a vehicle and a user, comprising:

detecting the user within an area of the vehicle;
determining a user location based on communication with a unique device associated with the user;
predicting a path to the vehicle based at least in part on the user location; and
instructing a light mechanism to illuminate the area along the path.

10. The method of claim 9, further comprising determining a subsequent user location and instructing the light mechanism to illuminate a subsequent area along the path based on the subsequent user location.

11. The method of claim 10, further comprising determining a user speed based on the subsequent user location and instructing the light mechanism to iteratively illuminate the area along the path consistent with the user speed.

12. The method of claim 10, wherein the light mechanism includes a plurality of light emitting diodes (LEDs), and wherein each of the LEDs is configured to illuminate a portion of the predicted path.

13. The method of claim 12, further comprising instructing a subset of the LEDs to illuminate, wherein the subset of LEDs correspond to the predicted path that includes the user location.

14. The method of claim 11, wherein the light mechanism includes a plurality of lasers, and wherein each of the lasers is configured to illuminate a portion of the predicted path.

15. The method of claim 14, further comprising instructing a subset of the lasers to activate, wherein the subset of lasers correspond to the predicted path.

16. A vehicle illumination system, comprising:
a light mechanism arranged on a vehicle;
at least one antenna configured to detect a unique device of an approaching user; and
at least one controller configured to:
 determine a first user location based on the detected unique device,
 predict a path between the user and the vehicle based at least in part on the first user location,
 instruct the light mechanism to illuminate a first area along the path,
 determine a second user location based on the detected unique device,
 instruct the light mechanism to illuminate a second area along the path.

17. The system of claim 16, wherein the controller is further configured to:
determine a user speed based on the first and second user locations and instruct the light mechanism to iteratively illuminate the second area along the path consistent with the user speed.

18. The system of claim 16, wherein the light mechanism includes a plurality of light mechanisms configured to illuminate a portion of the predicted path.

19. The system of claim 18, wherein the controller is further configured to instruct a subset of the LEDs to illuminate, wherein the subset of LEDs correspond to the LEDs configured to illuminate the portion of the predicted path that includes the user location.

20. The system of claim 16, wherein the light mechanism includes a light source operably connected to a driver, the light source being moveable at at least one axis via the driver, and wherein the controller is further configured to instruct the driver to move the light source to illuminate the second area.

* * * * *